US012316011B2

(12) United States Patent
Li et al.

(10) Patent No.: US 12,316,011 B2
(45) Date of Patent: *May 27, 2025

(54) CLOAKED RADIATING ELEMENTS HAVING ASYMMETRIC DIPOLE RADIATORS AND MULTIBAND BASE STATION ANTENNAS INCLUDING SUCH RADIATING ELEMENTS

(71) Applicant: Outdoor Wireless Networks LLC, Claremont, NC (US)

(72) Inventors: Haifeng Li, Richardson, TX (US); Peter J. Bisiules, LaGrange Park, IL (US); Xiangyang Ai, Plano, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 688 days.

This patent is subject to a terminal disclaimer.

(21) Appl. No.: 17/204,356

(22) Filed: Mar. 17, 2021

(65) Prior Publication Data

US 2021/0305721 A1 Sep. 30, 2021

Related U.S. Application Data

(60) Provisional application No. 62/994,962, filed on Mar. 26, 2020.

(51) Int. Cl.

*H01Q 21/24* (2006.01)
*H01Q 1/24* (2006.01)
(Continued)

(52) U.S. Cl.

CPC ............ *H01Q 21/24* (2013.01); *H01Q 1/246* (2013.01); *H01Q 9/065* (2013.01); *H01Q 21/062* (2013.01)

(58) Field of Classification Search

CPC ........... H01Q 21/24; H01Q 5/48; H01Q 9/06; H01Q 9/16; H01Q 21/06; H01Q 21/26; H01Q 21/062; H01Q 9/065; H01Q 1/246

See application file for complete search history.

(56) References Cited

U.S. PATENT DOCUMENTS 9,077,070 B2 * 7/2015 Zimmerman .......... H01Q 1/246
10,879,605 B2 * 12/2020 Varnoosfaderani .... H01Q 1/246
(Continued)

FOREIGN PATENT DOCUMENTS

WO 2018208195 A1 11/2018

OTHER PUBLICATIONS

"European Search Report corresponding to European Application No. 21165218.5, mailing date: Aug. 2, 2021, 11 pages".

*Primary Examiner* — Dimary S Lopez Cruz
*Assistant Examiner* — Aladdin Abdulbaki
(74) *Attorney, Agent, or Firm* — Myers Bigel, P.A.

(57) ABSTRACT

A dual-polarized radiating element includes a first dipole radiator that has a first dipole arm that generally extends along a first axis and a second dipole arm that generally extends along a second axis that is different from the first axis, and a second dipole radiator that has a third dipole arm that generally extends along the first axis and a fourth dipole arm that generally extends along a third axis that is different from the first axis. At least one of the first through fourth dipole arms may be a cloaked dipole arm that include inductive elements that are configured to suppress currents in a higher frequency band.

17 Claims, 10 Drawing Sheets

(51) Int. Cl.
*H01Q 9/06* (2006.01)
*H01Q 21/06* (2006.01)

(56) References Cited

U.S. PATENT DOCUMENTS

| | | | | |
|---|---|---|---|---|
| 12,062,855 | B2 * | 8/2024 | Li | H01Q 21/062 |
| 2008/0079647 | A1 * | 4/2008 | Schadler | H01Q 1/246 343/816 |
| 2011/0175782 | A1 | 7/2011 | Choi et al. | |
| 2012/0280879 | A1 * | 11/2012 | Zimmerman | H01Q 19/24 343/798 |
| 2013/0093639 | A1 * | 4/2013 | Aoki | H01Q 21/26 343/797 |
| 2015/0102971 | A1 | 4/2015 | Liu et al. | |
| 2018/0309204 | A1 * | 10/2018 | Ng | H01Q 21/28 |
| 2018/0323513 | A1 * | 11/2018 | Varnoosfaderani | H01Q 21/062 |

* cited by examiner

CLOAKED RADIATING ELEMENTS HAVING ASYMMETRIC DIPOLE RADIATORS AND MULTIBAND BASE STATION ANTENNAS INCLUDING SUCH RADIATING ELEMENTS

CROSS-REFERENCE TO RELATED APPLICATION

The present application claims priority to U.S. Provisional Patent Application Ser. No. 62/994,962, filed Mar. 26, 2020, the entire content of which is incorporated herein by reference.

BACKGROUND

The present invention generally relates to radio communications and, more particularly, to base station antennas for cellular communications systems.

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular to the horizontal plane that is defined by the horizon. Reference will also be made to the azimuth plane, which is a horizontal plane that bisects the base station antenna, and to the elevation plane, which is a plane extending along the boresight pointing direction of the antenna that is perpendicular to the azimuth plane.

A common base station configuration is the "three sector" configuration in which a cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that each antenna beam provides good coverage throughout a 120° sector. Three such base station antennas provide full 360° coverage in the azimuth plane. Typically, each base station antenna will include one or more so-called "linear arrays" of radiating elements that includes a plurality of radiating elements that are arranged in a generally vertically-extending column. Each radiating element may have an azimuth HPBW of approximately 65° so that the antenna beam generated by the linear array will have a HPBW of about 65° in the azimuth plane. By providing a phase-controlled column of radiating elements extending along the elevation plane, the HPBW of the antenna beam in the elevation plane may be narrowed to be significantly less than 65°, with the amount of narrowing increasing with the length of the column in the vertical direction.

As the volume of cellular traffic has grown, cellular operators have added new cellular services in a variety of new frequency bands. When these new services are introduced, the existing "legacy" services typically must be maintained to support legacy mobile devices. In some cases, it may be possible to use linear arrays of so-called "wide-band" or "ultra-wide-band" radiating elements to support service in the new frequency bands. In other cases, however, it may be necessary to deploy additional linear arrays (or multi-column arrays) of radiating elements to support service in the new frequency bands. Due to local zoning ordinances and/or weight and wind loading constraints, there is often a limit as to the number of base station antennas that can be deployed at a given base station. Thus, to reduce the number of antennas, many operators deploy so-called "multiband" base station antennas that include multiple linear arrays of radiating elements that communicate in different frequency bands to support multiple different cellular services. Additionally, with the introduction of fifth generation (5G) cellular services, multi-column arrays of radiating elements are being added to base station antennas that can support beamforming and/or massive multi-input-multi-output ("MIMO") 5G services.

One multiband base station antenna that is currently of interest includes two linear arrays of "low-band" radiating elements that are used to provide service in some or all of the 617-960 MHz frequency band, as well as a massive MIMO array of "high-band" radiating elements that operate in, for example, some or all of the 2.5-2.7 GHz frequency band, the 3.4-3.8 GHz frequency band, or the S. 1-5.8 GHz frequency band. Massive MIMO arrays typically have at least four columns of radiating elements, and as many as thirty-two columns of radiating elements. Most proposed implementations include eight columns of radiating elements (or vertically stacked sets of eight column arrays to obtain sixteen or thirty-two column arrays). One example of such a base station antenna 10 is shown schematically in FIG. 1.

Referring to FIG. 1, the base station antenna 10 includes first and second linear arrays 20-1, 20-2 of low-band radiating elements 22 and a multi-column array 40 of high-band radiating elements 42, here shown with eight columns. The multi-column array 40 of high-band radiating elements 42 may be a massive MIMO high-band array. The radiating elements 22, 42 may be mounted to extend forwardly from a reflector 12 which may serve as a ground plane for the radiating elements 22, 42. As shown in FIG. 1, the low-band linear arrays 20 typically extend for the full length of the base station antenna 10. The multi-column high-band array 40 is positioned between low-band linear arrays 20-1, 20-2. Note that herein like elements may be assigned two-part reference numerals. These elements may be referred to individually by their full reference numeral (e.g., low-band linear array 20-2) and collectively by the first part of their reference numeral (e.g., the low-band linear arrays 20).

The base station antenna 10, however, can be challenging to implement in a commercially acceptable manner because achieving a 65° azimuth HPBW antenna beam in the low-band typically requires low-band radiating elements that are, for example, about 200 mm (or more) wide. If the massive MIMO high-band array 40 is positioned between the two low-band linear arrays 20-1, 20-2, the base station antenna 10 will become wider than is considered commercially acceptable (having a width that is, for example, wider than 500 mm). While, the massive MIMO high-band array 40 could alternatively be positioned either above or below the low-band arrays 20-1, 20-2 on reflector 12 in order to decrease the width of the base station antenna 10, this would increase the length and cost of the base station antenna 10 to the point where the antenna is likely to be considered commercially unacceptable. Accordingly, improved base station antenna designs are needed.

SUMMARY

Pursuant to embodiments of the present invention, dual-polarized radiating elements for base station antennas are provided that include first and second dipole radiators. The first dipole radiator includes a first dipole arm that is configured to have an average current direction that extends in a first direction and a second dipole arm that is configured to have an average current direction that extends in a second direction, where the second direction forms a first oblique angle with the first direction. The second dipole radiator includes a third dipole arm that is configured to have an average current direction that extends in the third direction and a fourth dipole arm that is configured to have an average current direction that extends in a fourth direction, where the fourth direction forms a second oblique angle with the third direction.

In some embodiments, the first oblique angle may be substantially the same as the second oblique angle. In some embodiments, the first and second oblique angles may be obtuse angles, while in other embodiments the first and second oblique angles may be acute angles.

In some embodiments, at least one of the first and second dipole arms may include a plurality of spaced-apart conductive members that are connected to each other via respective inductive trace segments.

In some embodiments, at least one of the first through fourth dipole arms may be in the form of a conductive loop. For example, all of the first through fourth dipole arms may be conductive loops, where each conductive loop includes a plurality of conductive members and a plurality inductive trace segments, the inductive trace segments being narrower than the conductive members.

In some embodiments, the first dipole radiator may be configured to transmit RF radiation having slant −45° polarization, and the second dipole radiator may be configured to transmit RF radiation having slant +45° polarization.

In some embodiments, the first through fourth dipole arms may meet in a central region of the radiating element, and the first dipole arm may extend upwardly from the central region, the third dipole arm may extend downwardly from the central region, and the second and fourth dipole arms may both extend to a first side of the central region.

Pursuant to further embodiments of the present invention, dual-polarized radiating elements for base station antennas are provided that include first and second dipole radiators. The first dipole radiator includes a first dipole arm that generally extends along a first axis and a second dipole arm that generally extends along a second axis that is different from the first axis and a second dipole radiator that includes a third dipole arm that generally extends along the first axis and a fourth dipole arm that generally extends along a third axis that is different from the first axis. At least one of the first through fourth dipole arms comprises a cloaked dipole arm that include inductive elements that are configured to suppress currents in a higher frequency band.

In some embodiments, each of the first through fourth dipole arms may comprise a conductive loop. In some embodiments, each conductive loop may have first and second spaced apart opposed segments, and a first segment of the first dipole arm may be substantially collinear with a first segment of the third dipole arm.

In some embodiments, each conductive loop may have first and second spaced apart opposed segments, and a first segment of the second dipole arm may be substantially parallel to a first segment of the fourth dipole arm.

In some embodiments, the first through fourth dipole arms may each include a plurality of spaced-apart conductive members that are connected to each other via respective inductive trace segments.

In some embodiments, the first dipole arm may be configured to have an average current direction that extends in a first direction and the second dipole arm may be configured to have an average current direction that extends in a second direction, where the first and second directions intersect to define an obtuse angle.

In some embodiments, the first dipole radiator may be configured to transmit RF radiation having slant −45° polarization, and the second dipole radiator may be configured to transmit RF radiation having slant +45° polarization.

In some embodiments, the first through fourth dipole arms may meet in a central region of the radiating element, and the first dipole arm may extend upwardly from the central region, the third dipole arm may extend downwardly from the central region, and the second and fourth dipole arms may both extend to a first side of the central region.

Pursuant to additional embodiments of the present invention, dual-polarized radiating elements for base station antennas are provided that include a feed stalk and a dipole radiator printed circuit board mounted on the feed stalk, the dipole radiator printed circuit board including first through fourth dipole arms that extend from a central region where the feed stalk electrically connects to the dipole radiator printed circuit board. The first dipole arm extends generally upwardly from the central region, the third dipole arm extends generally downwardly from the central region, and the second and fourth dipole arms both extend generally to a first side of the central region.

In some embodiments, each of the first through fourth dipole arms may comprise a conductive loop.

In some embodiments, the first and third dipole arms may form a first dipole radiator and the second and fourth dipole arms may form a second dipole radiator.

In some embodiments, each conductive loop may have first and second opposed segments, and a first segment of the second dipole arm may extend substantially parallel to a first segment of the fourth dipole arm.

In some embodiments, a first segment of the first dipole arm may extend substantially collinear to a first segment of the third dipole arm.

In some embodiments, the first dipole radiator may be configured to transmit RF radiation having slant −45° polarization, and the second dipole radiator may be configured to transmit RF radiation having slant +45° polarization.

In some embodiments, the first dipole arm may be configured to have an average current direction that extends in a first direction and the second dipole arm may be configured to have an average current direction that extends in a second direction, where the first and second directions intersect to define a first obtuse angle.

In some embodiments, the third dipole arm may be configured to have an average current direction that extends in a third direction and the fourth dipole arm may be configured to have an average current direction that extends in a fourth direction, where the third and fourth directions intersect to define a second obtuse angle.

In some embodiments, the first obtuse angle may be equal to the second obtuse angle.

In some embodiments, at least one of the first and second dipole arms may include a plurality of spaced-apart conductive members that are connected to each other via respective inductive trace segments.

Pursuant to further embodiments of the present invention, dual-polarized radiating elements for base station antennas are provided that include first and second dipole radiators. The first dipole radiator includes a first dipole arm and a second dipole arm and the second dipole radiator that includes a third dipole arm and a fourth dipole arm. The first and third dipole arms each include first and second spaced apart segments, where the first segment of the first dipole arm is collinear with the first segment of the third dipole arm.

In some embodiments, the second and fourth dipole arms each include first and second spaced apart segments, where the first segment of the first dipole arm is parallel to the first segment of the fourth dipole arm.

In some embodiments, the first segment of the first dipole arm may not be collinear with the first segment of the fourth dipole arm.

In some embodiments, the first dipole radiator may be configured to transmit RF radiation having slant −45° polarization, and the second dipole radiator may be configured to transmit RF radiation having slant +45° polarization.

In some embodiments, the first through fourth dipole arms may meet in a central region of the radiating element, and the first dipole arm may extend upwardly from the central region, the third dipole arm may extend downwardly from the central region, and the second and fourth dipole arms may both extend to a first side of the central region.

Pursuant to yet additional embodiments, base station antennas are provided that include a reflector, a first array comprising a first vertically-extending column of lower-band radiating elements that are mounted to extend forwardly from the reflector, a second array comprising a second vertically-extending column of lower-band radiating elements that are mounted to extend forwardly from the reflector, and a multi-column array of higher-band radiating elements that is positioned between the first array and the second array. The first and second arrays each include at least one radiating element of a first type that is horizontally adjacent the multi-column array of higher-band radiating elements and at least one radiating element of a second type that is not horizontally adjacent the multi-column array of higher-band radiating elements, wherein the first type is different from the second type. At least one of the radiating elements in the first array of lower-band radiating elements includes cloaked dipole arms that have inductive elements that are configured to suppress currents in an operating frequency band of the multi-column array.

In some embodiments, the first array of lower-band radiating elements may extend along a first side of the reflector and the second array of lower-band radiating elements may extend along a second side of the reflector.

In some embodiments, the radiating element of the first type may include a first dipole radiator that includes a first dipole arm that is configured to have an average current direction that extends in a first direction and a second dipole arm that is configured to have an average current direction that extends in a second direction, where the second direction forms a first oblique angle with the first direction, and a second dipole radiator that includes a third dipole arm that is configured to have an average current direction that extends in a third direction and a fourth dipole arm that is configured to have an average current direction that extends in a fourth direction, where the third direction forms a second oblique angle with the fourth direction.

In some embodiments, the first oblique angle may be substantially the same as the second oblique angle. In some embodiments, the first and second oblique angles may be obtuse angles.

In some embodiments, at least one of the first through fourth dipole arms may be in the form of a conductive loop.

In some embodiments, the first dipole radiator may be configured to transmit RF radiation having slant −45° polarization, and the second dipole radiator may be configured to transmit RF radiation having slant +45° polarization.

In some embodiments, the radiating element of the second type may comprise a cross-dipole radiating element that includes a pair of dipole radiators that each comprise two collinear dipole arms.

In some embodiments, the radiating element of the first type may comprise first through fourth dipole arms that meet in a central region of the radiating element, and the first dipole arm extends upwardly from the central region, the third dipole arm extends downwardly from the central region, and the second and fourth dipole arms both extend to a first side of the central region.

In some embodiments, the radiating element of the first type may comprise a first dipole radiator that includes a first dipole arm and a second dipole arm that is not collinear with the first dipole arm and a second dipole radiator that includes a third dipole arm and a fourth dipole arm that is not collinear with the third dipole arm.

DETAILED DESCRIPTION

Figure 1:
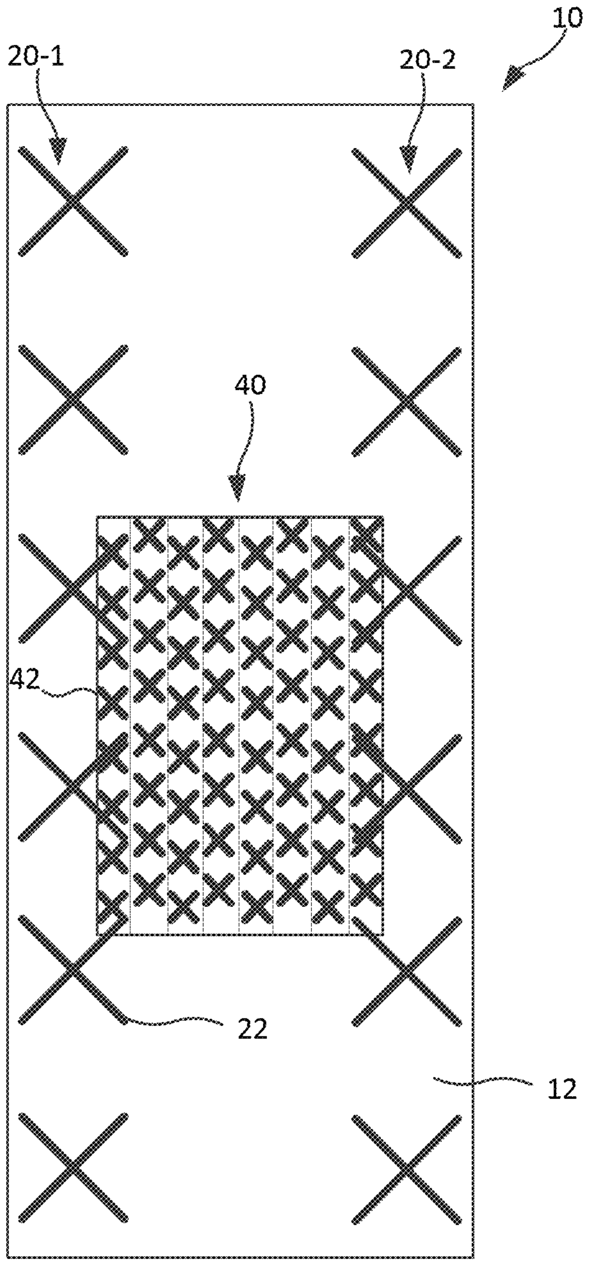
FIG. 1 is a schematic front view of a base station antenna that includes two linear arrays of low-band radiating elements and a massive MIMO array of high-band radiating elements.

Pursuant to embodiments of the present invention, low-band radiating elements are provided that may be used in base station antennas that also include a massive MIMO array. The low-band radiating elements according to embodiments of the present invention may comprise modified tri-pol radiating elements that include a total of four dipole arms. The dipole arms include a generally upwardly extending dipole arm and a first generally laterally extending dipole arm that together form a first dipole radiator, and a generally downwardly extending dipole arm and a second generally laterally extending dipole arm that together form a second dipole radiator. The first and second laterally extending arms extend from the same side of an axis defined by the upwardly and downwardly extending dipole arms. The low-band radiating elements may be cloaked low-band radiating elements that are configured to be substantially transparent to RF energy in the operating frequency band of the massive MIMO array.

The first dipole arm may be configured so that when the first dipole radiator is excited the current flowing on the first dipole arm will have an average current direction that extends in a first direction, and the second dipole arm may be configured so that when the first dipole radiator is excited the current flowing on the second dipole arm will have an average current direction that extends in a second direction, where the second direction forms a first oblique angle with the first direction. Similarly, the third dipole arm may be configured so that when the second dipole radiator is excited the current flowing on the third dipole arm will have an average current direction that extends in a third direction, and the fourth dipole arm may be configured so that when the second dipole radiator is excited the current flowing on the fourth dipole arm will have an average current direction that extends in a fourth direction, where the third direction forms a second oblique angle with the fourth direction. The first and second oblique angles may be obtuse angles in some embodiments, while the first and second dipole radiators may be configured to transmit RF radiation having slant −45° and slant +45° polarization. These radiating elements may be particularly well-suited for use in base station antennas that have a multi-column array that operates in a higher frequency band than the radiating elements according to embodiments of the present invention.

One problem with including arrays of radiating elements that operate in different frequency bands in the same base station antenna is that undesired interactions may occur between the radiating elements that operate in different frequency bands. For example, radiation emitted by the higher band radiating element may induce currents on the dipole arms of nearby lower band radiating elements, which may distort the antenna beam generated by the higher band radiating elements. Such interactions can be reduced by increasing the spacing between the different arrays of radiating elements. However, as base station antennas are being introduced that include large numbers of columns of radiating elements that operate in different frequency bands, using spatial separation becomes impractical.

Figure 2A:
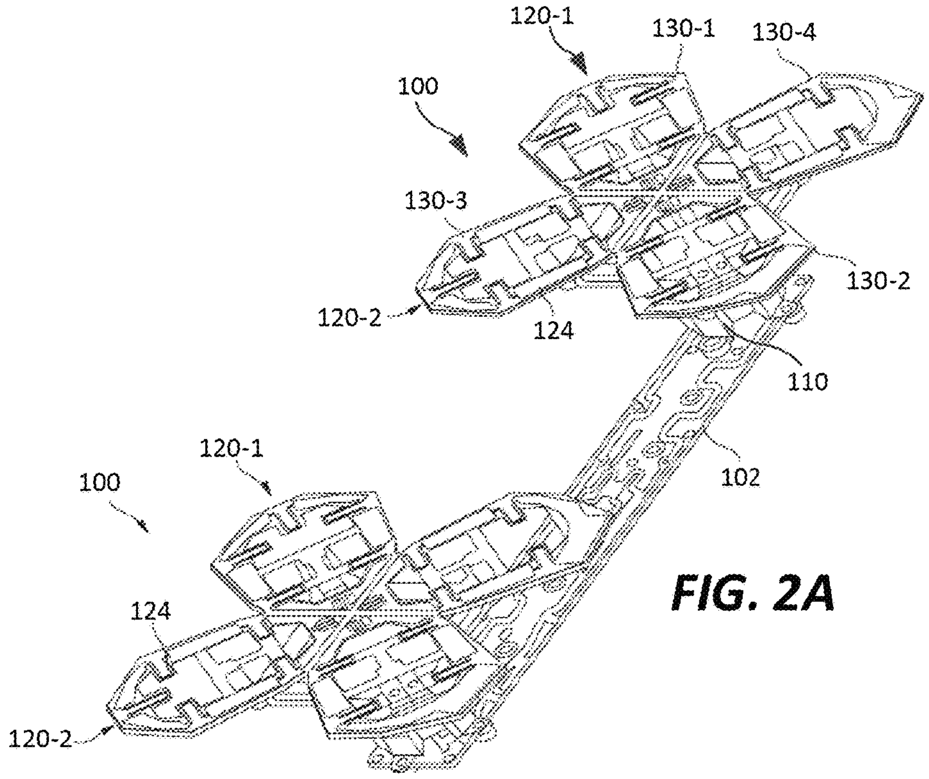
FIG. 2A is a side perspective view of two conventional cloaked low-band radiating elements for a base station antenna mounted on a feed board.
Figure 2B:
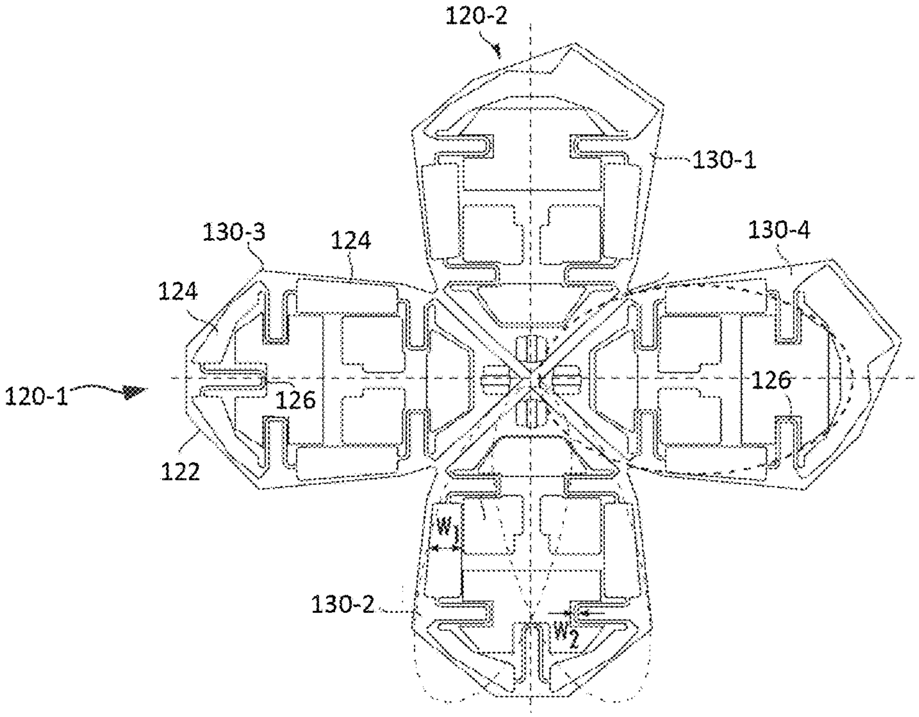
FIG. 2B is a front view of one of the conventional cloaked low-band radiating elements of FIG. 2A.

So-called "cloaked" low-band radiating elements have been developed that are designed to be "transparent" to RF signals in the operating frequency band of nearby higher-band radiating elements. FIGS. 2A and 2B illustrate one example of a known cloaked dual-polarized low-band radiating element 100, which is disclosed in U.S. Patent Publication No. 2018/0323513 ("the '513 publication"), filed Feb. 15, 2018, the entire content of which is incorporated herein by reference. The radiating element 100 generates both slant −45° and slant +45° radiation, and is typically called a "cross-dipole" radiating element as it includes two dipole radiators that form a cross shape when viewed from the front. FIG. 2A is a side perspective view of two of the conventional cloaked low-band radiating elements 100 of the '513 publication mounted on a feed board 102. FIG. 2B is a front view of one of the cloaked low-band radiating elements 100 that better illustrates the design of the dipole radiators thereof.

As shown in FIGS. 2A-2B, each cloaked low-band radiating element 100 includes first and second dipole radiators 120-1, 120-2 that are mounted on a feed stalk 110 (which is barely visible in FIG. 2A). Dipole radiator 120-1 comprises a pair of dipole arms 130-1, 130-2, and dipole radiator 120-2 comprises a pair of dipole arms 130-3, 130-4. The length of each dipole arm 130 may be, for example, approximately 0.2 to 0.35 of an operating wavelength, where the "operating wavelength" refers to the wavelength corresponding to the center frequency of the operating frequency band of the radiating element 100. Each dipole arm 130 may be formed as a metal pattern on a printed circuit board 122 that includes a plurality of widened conductive elements or "members" 124 that are physically and electrically connected by narrow meandered trace segments 126. The narrowed meandered trace sections 126 are designed to act as high impedance sections that interrupt currents associated with radiation emitted by a nearby mid-band radiating element (not shown) that otherwise would be induced on the dipole arms 130. In particular, the narrowed meandered trace sections 126 may act like inductors that help to interrupt currents in the mid-band frequency range while allowing currents in the low-band frequency range to pass between adjacent widened conductive members 124. Thus, the narrowed meandered trace sections 126 may create a high impedance for mid-band currents without significantly impacting the ability of the low-band currents to flow on the dipole arms 130. As such, the narrowed meandered trace sections 126 may reduce induced mid-band currents on the low-band radiating element 100 and consequent disturbance to the antenna pattern of nearby mid-band linear arrays (not shown).

While radiating element 100 may facilitate tightly packing both low-band and mid-band linear arrays into a base station antenna, other problems may arise when both low-band linear arrays and a massive MIMO high-band array are implemented in the same antenna, such as the antenna 10 of FIG. 1 discussed above. In particular, the high-band radiating elements in a massive MIMO array are typically closely packed together such that there may not be physical room between adjacent high-band radiating elements to mount the feed stalks for the low-band radiating elements. If that is the case, the feed stalks for the low-band radiating elements must be mounted on either side of the massive MIMO high-band array. Given the large physical size of the low-band radiating elements and the width of an eight column massive MIMO high-band array, the width of the antenna may become very large. Moreover, even if the feed stalks for the low-band radiating elements could potentially be fit in-between clusters of high-band radiating elements, in some applications the high-band array must be a modular array that can be removed and replaced, which precludes mounting low-band radiating elements within the footprint of the high-band array.

Figure 3A:
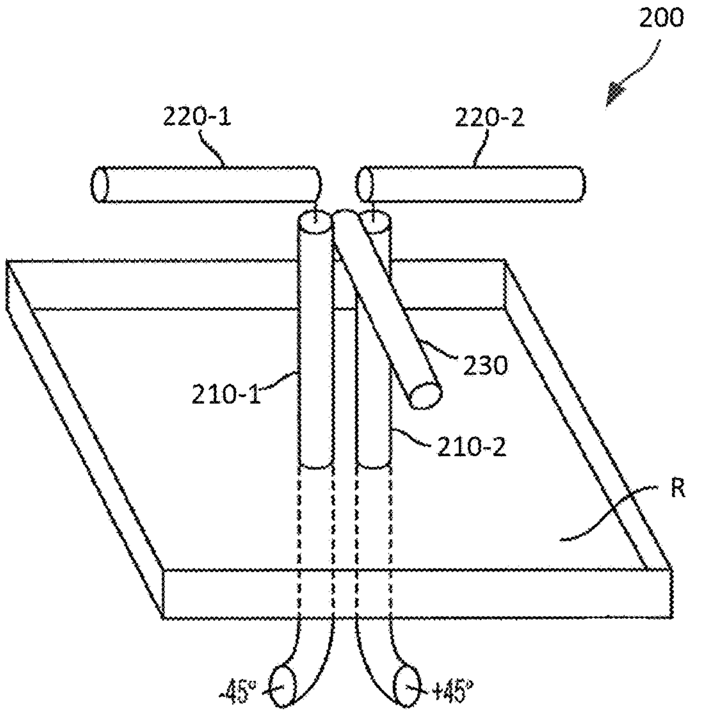
FIG. 3A is a schematic view of a conventional "tri-pol" low-band radiating element.
Figure 3B:
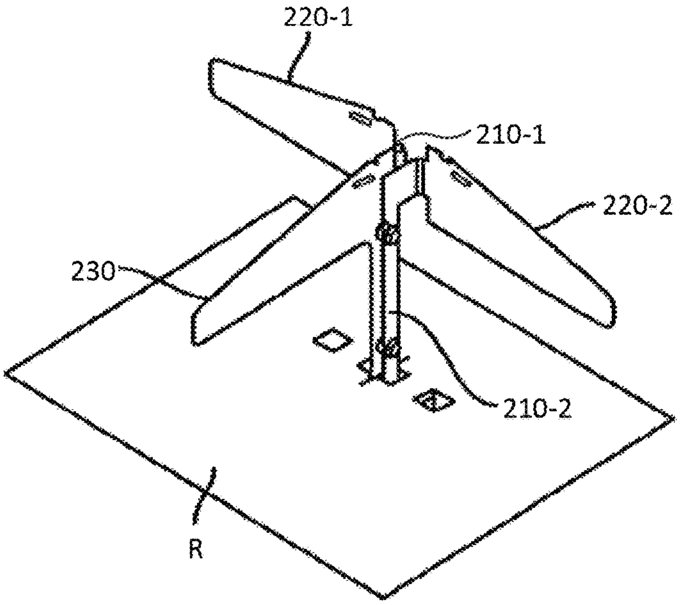
FIG. 3B is a perspective view of a conventional implementation of the tri-pol low-band radiating element of FIG. 3A.
Figure 3C:
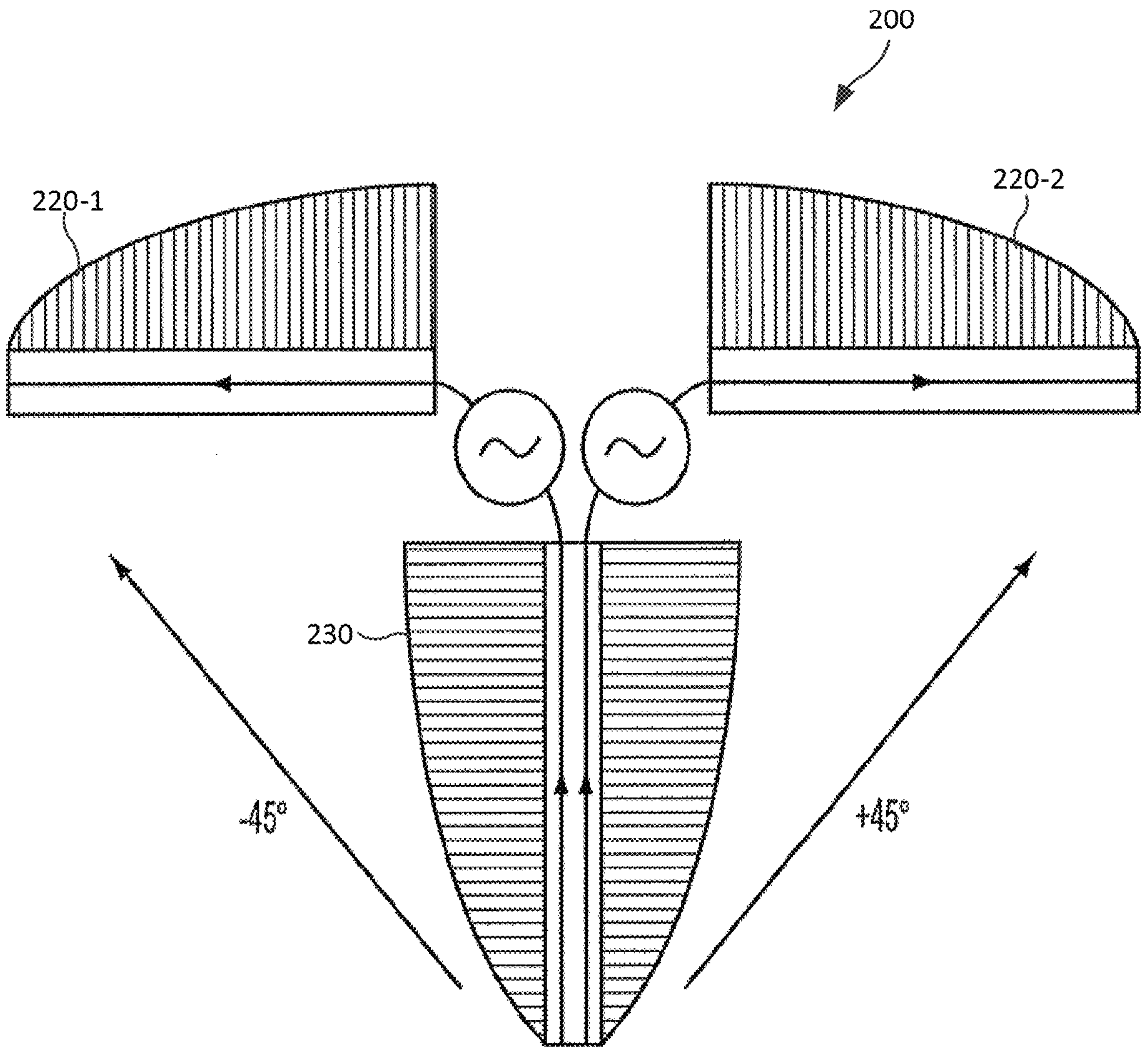
FIG. 3C is a schematic diagram that shows the current directions on the dipole arms and the polarization vectors of the radiation pattern generated by the tri-pol radiating element of FIG. 3B.

Another known dual-polarized radiating element is the so-called "tri-pol" radiating element. FIG. 3A is a schematic view of a conventional tri-pol radiating element that illustrates the operation thereof, while FIG. 3B is a perspective view of an actual implementation of the tri-pol radiating element of FIG. 3A. Both figures are taken from U.S. Pat. No. 9,077,070, the entire content of which is incorporated herein by reference. As shown in FIGS. 3A-3B, the conventional tri-pol radiating element 200 has three arms: namely a pair of side arms 220-1, 220-2 and a central arm 230. The length of each arm 220, 230 may be about one quarter wavelength of the center frequency of the operating frequency band. As shown schematically in FIG. 3A, the side arms 220-1, 220-2 are connected to the central conductors of respective coaxial feed lines 210-1, 210-2, while central arm 230 is connected to the respective outer conductors of coaxial feed lines 210-1, 210-2. The outer conductors of coaxial feed lines 210-1, 210-2 are connected to a reflector R of the base station antenna. The tri-pol radiating element 200 may be considered as a combination of two dipole radiators with arms bent by 90 degrees. Referring to FIG. 3C, an equivalent diagram shows the current directions on the dipole arms 220, 230 and the polarization vectors of the radiation field (+45° and −45° slant polarizations). The +45° slant and the −45° slant are with respect to side arms 210 and 220. Thus, side arms 220-1 and 220-2 may be oriented horizontally or vertically with respect to the longitudinal axis of the reflector R to achieve +/−45° slant polarization.

The tri-pol radiating element 200 is physically smaller than a conventional cross dipole radiating element. Additionally, the feed stalks 210 for the tri-pol radiating element 200 are not directly behind the center of the radiating element 200, as is the case with respect to most conventional cross-dipole radiating elements, but instead is offset to one side. As such, columns of tri-pol radiating elements 200 could be mounted on either side of a high-band array without extending the width of the antenna as much as would an array of conventional cross-dipole radiating elements.

Unfortunately, however, undesired interaction may occur between low-band and high-band radiating elements when they are in close proximity to each other, just as can happen with low-band and mid-band radiating elements, as discussed above. Such interaction may cause a scattering of the high-band RF signals that can negatively impact various characteristics of the high-band antenna beams including the azimuth and elevation beamwidths, beam squint, antenna beam pointing angle, gain, front-to-back ratio, cross-polarization discrimination and the like. Moreover, the effects of scattering may vary significantly with frequency, which may make it hard to compensate for these effects using other techniques.

As noted above, pursuant to embodiments of the present invention, modified tri-pol radiating elements for base station antennas are provided that may allow for compact base station antennas that have a massive MIMO high-band array interposed between a pair of low-band linear array of radiating elements. The modified tri-pol radiating elements according to embodiments of the present invention may be cloaked radiating elements and may be mounted very close to the edge of a reflector of a base station antenna. In some embodiments, the low-band linear arrays may be implemented entirely using the modified tri-pol radiating elements according to embodiments of the present invention. However, in other embodiments, the low-band linear arrays may include a mixture of cross-dipole and modified tri-pol radiating elements, which may provide enhanced performance in some applications.

Pursuant to some embodiments, dual-polarized radiating elements are provided that include a first dipole radiator that has a first dipole arm that is configured to have an average current direction that extends in a first direction and a second dipole arm that is configured to have an average current direction that extends in a second direction, where the second direction forms a first oblique angle with the first direction. These dual-polarized radiating elements also include a second dipole radiator that has a third dipole arm that is configured to have an average current direction that extends in a third direction and a fourth dipole arm that is configured to have an average current direction that extends in a fourth direction, where the third direction forms a first oblique angle with the fourth direction.

In some embodiments, the first and second oblique angles may be obtuse angles. In other embodiments, the first and second oblique angles may be acute angles. The first and second oblique angles may be the same in some embodiments. In each of these embodiments, the first dipole radiator may be configured to transmit RF radiation having slant −45° polarization, and the second dipole radiator may be configured to transmit RF radiation having slant +45° polarization.

Pursuant to additional embodiments, a dual-polarized radiating element is provided that include a first dipole radiator that has a first dipole arm that generally extends along a first axis and a second dipole arm that generally extends along a second axis that is different from the first axis, and a second dipole radiator that has a third dipole arm that generally extends along the first axis and a fourth dipole arm that generally extends along a third axis that is different from the first axis. At least one of the first through fourth dipole arms may be a cloaked dipole arm that include inductive elements that are configured to suppress currents in a higher frequency band.

Pursuant to other embodiments, a dual-polarized radiating element is provided that include a feed stalk and a dipole radiator printed circuit board mounted on the feed stalk. The dipole radiator printed circuit board includes first through fourth dipole arms that extend from a central region where the feed stalk electrically connects to the dipole radiator printed circuit board. The first dipole arm extends generally upwardly from the central region, the third dipole arm extends generally downwardly from the central region, and the second and fourth dipole arms both extend generally to a first side of the central region.

Pursuant to still other embodiments, dual-polarized radiating elements are provided that include a first dipole radiator that includes a first dipole arm and a second dipole arm and a second dipole radiator that includes a third dipole arm and a fourth dipole arm. The first and third dipole arms each include first and second spaced apart segments, where the first segment of the first dipole arm is collinear with the first segment of the third dipole arm. The second and fourth dipole arms may also each include first and second spaced apart segments, where the first segment of the second dipole arm is parallel to the first segment of the fourth dipole arm. The first segment of the second dipole arm may not be collinear with the first segment of the fourth dipole arm.

Pursuant to further aspects of the present invention, base station antennas are provided that include a reflector, a first array comprising a first vertically-extending column of lower-band radiating elements that are mounted to extend forwardly from the reflector, a second array comprising a second vertically-extending column of lower-band radiating elements that are mounted to extend forwardly from the reflector, and a multi-column array of higher-band radiating elements that is positioned between the first array and the second array. The first and second arrays each include at least one radiating element of a first type that is horizontally adjacent the multi-column array of higher-band radiating elements and at least one radiating element of a second, different, type that is not horizontally adjacent the multi-column array of higher-band radiating elements. At least one of the radiating elements in the first array of lower-band radiating elements includes cloaked dipole arms that have inductive elements that are configured to suppress currents in an operating frequency band of the multi-column array.

In some embodiments, the first array of lower-band radiating elements extends along a first side of the reflector and the second array of lower-band radiating elements extends along a second side of the reflector. In some embodiments, the radiating element of the first type comprises any of the radiating elements according to embodiments of the present invention that are disclosed herein. In some embodiments, the radiating element of the second type may comprise a cross-dipole radiating element that includes a first dipole radiator having first and second collinear dipole arms and a second dipole radiator having third and fourth collinear dipole arms.

Embodiments of the present invention will now be described in further detail with reference to FIGS. 4A-8B.

Figure 4A:
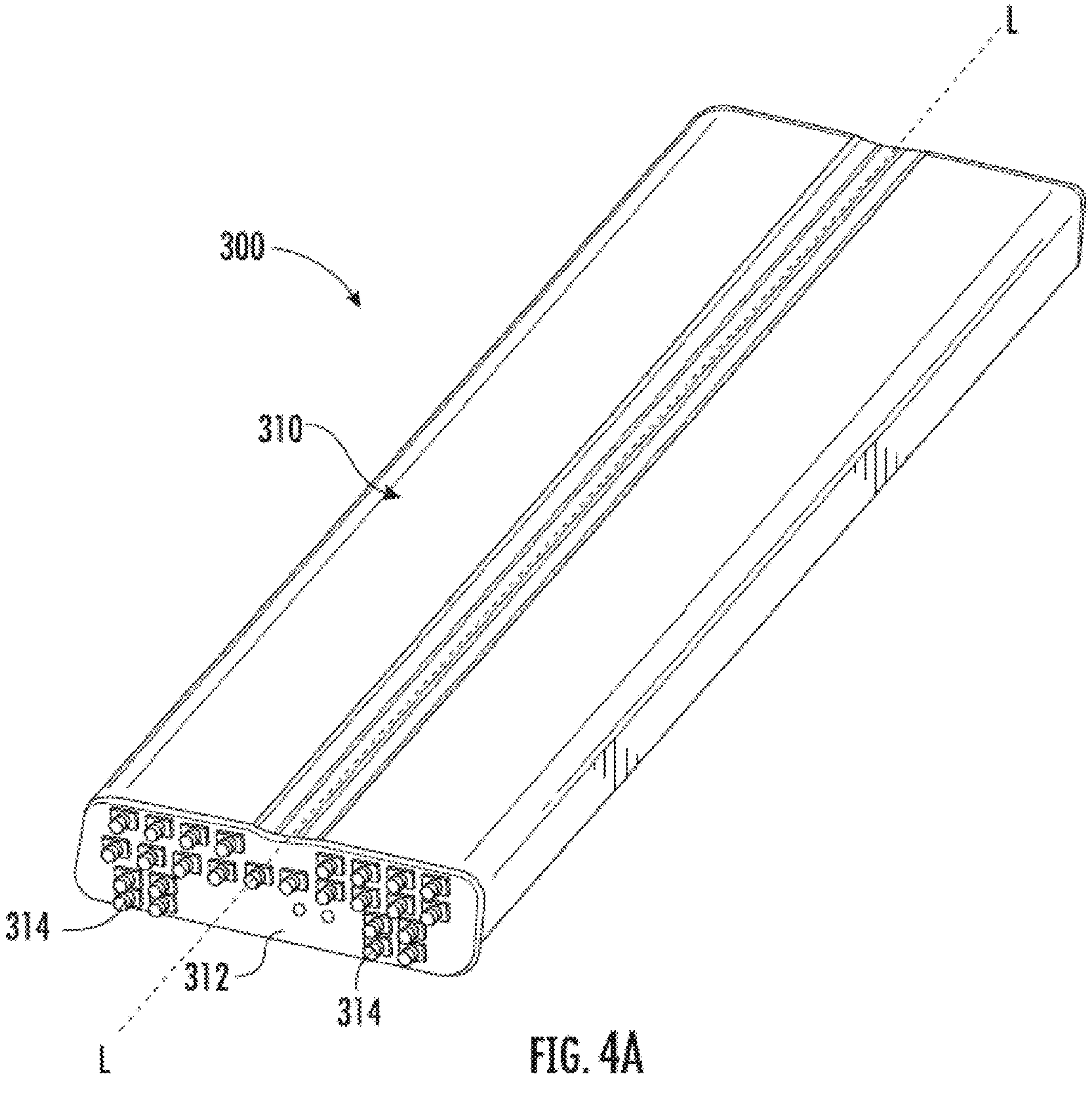
FIG. 4A is a perspective view of a base station antenna according to embodiments of the present invention.
Figure 4B:
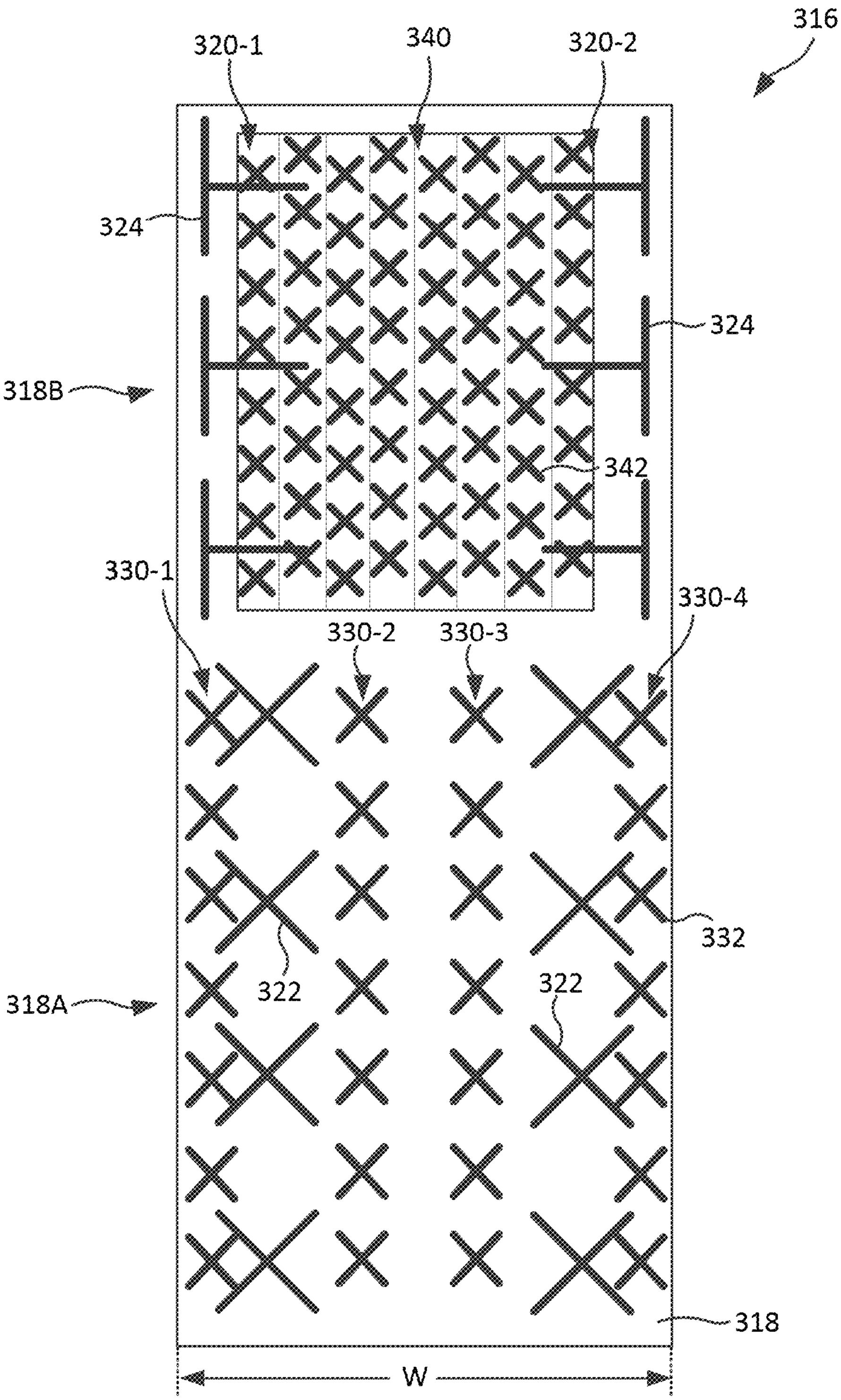
FIG. 4B is a schematic front view of the base station antenna of FIG. 4B with the radome removed that illustrates the arrays of radiating elements included in the antenna.

FIGS. 4A and 4B illustrate a base station antenna 300 according to certain embodiments of the present invention. In particular, FIG. 4A is a perspective view of the base station antenna 300, while FIG. 4B is a front view of the base station antenna 300 with the radome removed that schematically illustrates the linear arrays of radiating elements included in the antenna 300.

As shown in FIGS. 4A-4B, the base station antenna 300 is an elongated structure that extends along a longitudinal axis L. The base station antenna 300 may have a tubular shape with a generally rectangular cross-section. The antenna 300 includes a radome 310 and a bottom end cap 312. A plurality of RF connectors 314 may be mounted in the bottom end cap 312. The antenna 300 is typically mounted in a vertical configuration (i.e., the longitudinal axis L may be generally perpendicular to a plane defined by the horizon when the antenna 300 is mounted for normal operation).

Referring to FIG. 4B, the base station antenna 300 includes an antenna assembly 316 that may be slidably inserted into the radome 310. The antenna assembly 316 includes a backplane structure 318 that may act as both a ground plane and as a reflector for the antenna 300.

First and second low-band linear arrays 320-1, 320-2 that each include a plurality of low-band radiating elements are mounted to extend forwardly from the reflector 318. Two different styles of low-band radiating elements, namely low-band radiating elements 322 and low-band radiating element 324 are included in each low-band linear array 320. First through fourth mid-band linear arrays 330-1 through 330-4 that each include a plurality of mid-band radiating elements 332 are also mounted to extend forwardly from the reflector 318. The first and fourth mid-band linear arrays 330-1, 330-4 are mounted on the left and right edges of the reflector 318, outside of the respective first and second low-band linear arrays 320-1, 320-2. The second and third mid-band linear arrays 330-2, 330-3 are mounted between the first and second low-band linear arrays 320-1, 320-2.

The first and second low-band linear arrays 320-1, 320-2 each extend for substantially the full length of the reflector 318. The first through fourth mid-band linear arrays 330-1 through 330-4 are mounted along a lower portion 318A of the reflector 318, and do not extend for the full length of the reflector 318. As noted above, the first and second low-band linear arrays 320-1, 320-2 each include two different types of radiating elements 322, 324. The radiating elements 322 are cross-dipole radiating elements that include first and second dipole radiators that are arranged at angles of +45° and −45° with respect to the horizon when the base station antenna 300 is mounted for use. The radiating elements 322 may be implemented, for example, using any of the cloaking cross-dipole low-band radiating elements disclosed in the above-referenced '513 publication, although embodiments of the invention are not limited thereto. The bottom four low-band radiating elements of each low-band linear array 320 are implemented as radiating elements 322. The radiating elements 322 may all be in the lower portion 318A of the base station antenna 300.

The radiating elements 324 are modified tri-pol radiating elements according to embodiments of the present invention, and will be discussed in more detail below with reference to FIGS. 5A-8B.

As is further shown in FIG. 4B, the base station antenna 300 further includes a multi-column high-band array 340 of high-band radiating elements 342. The multi-column high-band array 340 is positioned between low-band linear arrays 320-1, 320-2 in the upper portion 318B of the antenna 300 between the three modified tri-pol radiating elements 324 that are included in each low-band linear array 320-1, 320-2.

In order to reduce the width W of antenna 300, the outer columns of radiating elements 342 in high-band array 340 may be in close proximity to the tri-pol radiating elements 324. While not shown in FIG. 4B, the low-band radiating elements 324 extend farther forwardly from the reflector 318 than do the high-band radiating elements 342, and portions of the low-band radiating elements 324 may "cover" some of the high-band radiating elements 342, meaning that an axis that is perpendicular to the reflector 318 may extend through both the low-band radiating element 322 and the high-band radiating element 342.

In an example embodiment, the low-band radiating elements 322, 324 may each be configured to transmit and receive signals in at least a portion of the 617-960 MHz frequency range. The mid-band radiating elements 332 may be configured to transmit and receive signals in a higher frequency range than the low-band radiating elements 322, 324, such as the 1427-2690 MHz frequency range or a smaller portion thereof. The high-band radiating elements 342 may be configured to transmit and receive signals in a higher frequency range than the mid-band radiating elements 332, such as the 3.4-3.8 GHz and/or 5.1-5.8 GHz frequency ranges or smaller portions thereof. In some cases, the high-band radiating elements 342 may be configured to transmit and receive signals in an upper portion of a mid-band frequency range such as 2.5-2.7 GHz. It will be appreciated, however, that embodiments of the present invention are not limited to the example embodiments discussed above.

All of the radiating elements 322, 324, 332, 342 may comprise dual-polarized radiating elements. Consequently, each array 320, 330, 340 may be used to form two separate antenna beams, namely an antenna beam having a slant +45° polarization and an antenna beam having a slant −45° polarization. It will be appreciated that the radiating elements in some or all of the linear arrays may not be perfectly aligned along a vertical axis but instead some of the radiating elements may be horizontally staggered with respect to other of the radiating elements in a particular array. Such a stagger is shown in FIG. 4B with the tri-pol radiating elements 324 positioned more toward the sides of the reflector 318 than the cross-dipole radiating elements 322. Staggered linear arrays may be used, for example, to narrow the azimuth beamwidth of the antenna beams generated by the linear array.

Figure 5A:
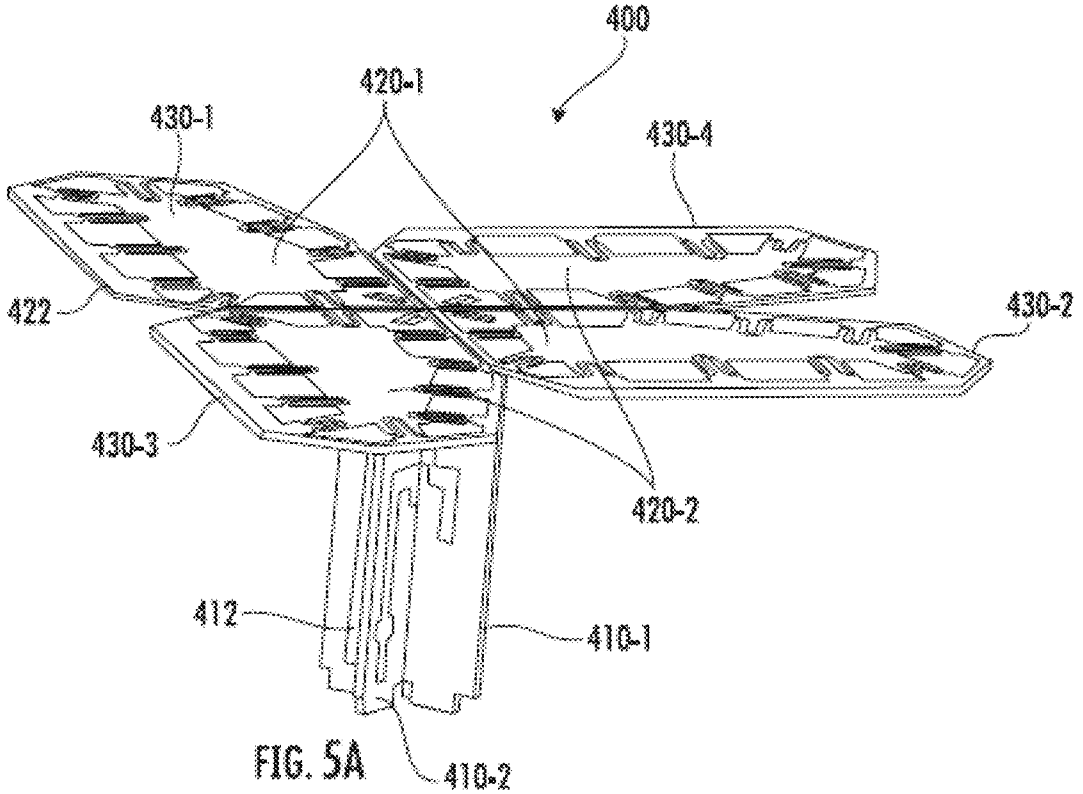
FIG. 5A is a side perspective view of a modified tri-pol low-band radiating element according to embodiments of the present invention.
Figure 5B:
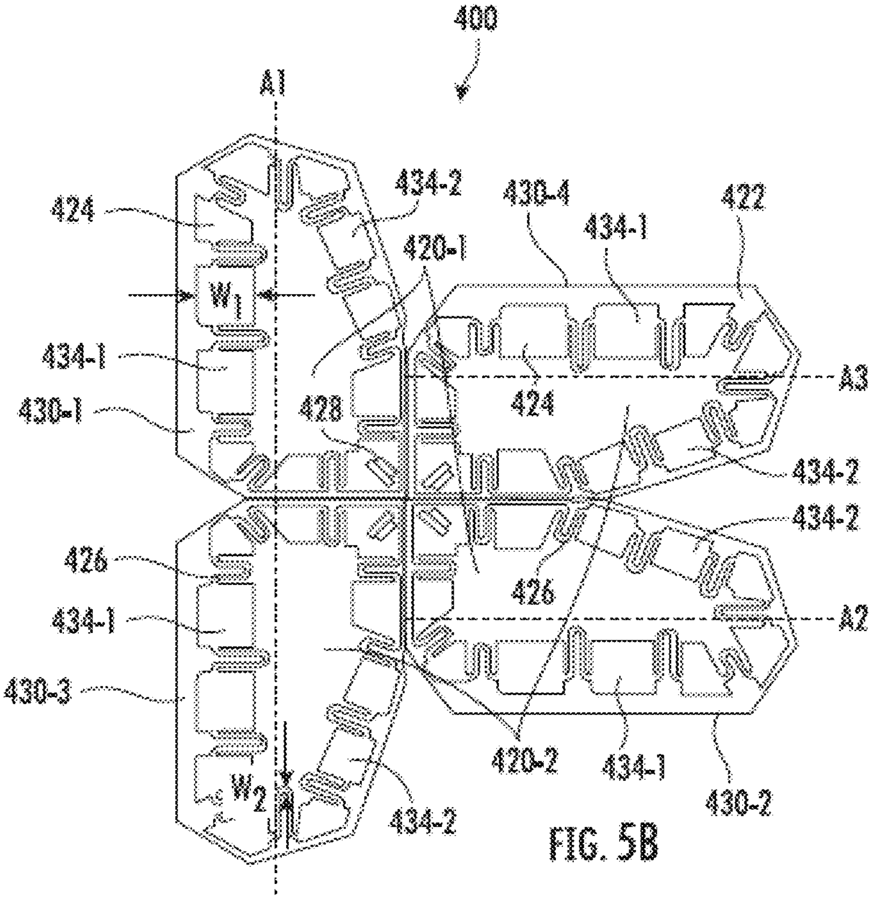
FIG. 5B is a front view of the modified tri-pol low-band radiating element of FIG. 5A.

FIG. 5A is a side perspective view of a tri-pol low-band radiating element 400 according to embodiments of the present invention. FIG. 5B is a front view of the cloaked tri-pol low-band radiating element 400 of FIG. 5A. The tri-pol low-band radiating element 400 may be used, for example, to implement the low-band radiating elements 324 included in base station antenna 300. Note that the tri-pol radiating elements according to embodiments of the present invention may include four dipole arms. Nevertheless, they are still referred to herein as “tri-pol” radiating elements or as “modified tri-pol” radiating elements since the overall design of the radiating element is more akin to a tri-pol radiating element than it is to a convention cross-polarized radiating element.

Referring to FIGS. 5A-5B, the cloaked tri-pol low-band radiating element 400 includes a pair of feed stalks 410-1, 410-2, and first and second dipole radiators 420-1, 420-2. The first dipole radiator 420-1 includes first and second dipole arms 430-1, 430-2, and the second dipole radiator 420-2 includes third and fourth dipole arms 430-3, 430-4. The first and third dipole arms 430-1, 430-3 generally extend along a first vertical axis A1 and the second and fourth dipole arms 430-2, 430-4 generally extend along respective second and third axes A2, A3 that are horizontal axes. Thus, tri-pol radiating element 400 includes a first dipole radiator 420-1 that has a first dipole arm 430-1 that generally extends along the first (vertical) axis A1 and a second dipole arm 430-2 that generally extends along a second (horizontal) axis A2, and a second dipole radiator 420-2 that has a third dipole arm 430-3 that generally extends along the first vertical axis A1 and a fourth dipole arm that generally extends along a third (horizontal) axis A3.

The first and second dipole radiators 420-1, 420-2 together have a shape similar to the Greek letter π (turned sideways in the view of FIG. 5B) when viewed from the front. In the depicted embodiment, dipole radiators 420-1, 420-2 are implemented on a common printed circuit board 422, although multiple printed circuit boards can be used in other embodiments, and/or the dipole radiators 420-1, 420-2 may be implemented using sheet metal or in other ways.

The feed stalks 410 may extend in a direction that is generally perpendicular to a plane defined by the printed circuit board 422. The feed stalks 410 may have RF transmission lines 412 formed thereon (see FIG. 5A) that are used to pass RF signals between the dipole radiators 420 and a feed network of a base station antenna that includes the tri-pol radiating element 400 (e.g., base station antenna 300 of FIGS. 4A-4B). The feed stalks 410 may be used to mount the dipole radiators 420 at an appropriate distance in front of the reflector 318 of base station antenna 300, which is often approximately 3/16 to 1/4 an operating wavelength. The “operating wavelength” refers to the wavelength corresponding to the center frequency of the operating frequency band of the radiating element 400. Moreover, while the dipole radiators 420-1, 420-2 extend in a plane that is generally parallel to the plane defined by an underlying reflector, it will be appreciated that in other embodiments the dipole arms 420-1, 420-2 could be rotated 90° along their respective longitudinal axes to be perpendicular to the reflector (or rotated at some other angle). The low-band radiating element 400 may be designed, for example, to operate in some or all the 617-960 MHz frequency band.

FIG. 5B is a front view of radiating element 400 that more clearly shows the design of the dipole radiators 420-1, 420-2 and the dipole arms 430-1 through 430-4 that form the dipole radiators 420.

Referring to FIG. 5B, it can be seen that in radiating element 400, the first through fourth dipole arms 430-1 through 430-4 each extend from a central region of the printed circuit board 422 where the feed stalks 410-1, 410-2 electrically connect to the dipole radiator printed circuit board 422. The first dipole arm 430-1 extends generally upwardly from the central region, the third dipole arm 430-3 extends generally downwardly from the central region, and the second and fourth dipole arms 430-2, 430-4 both extend generally to a first side of the central region.

As is also shown in FIG. 5B, the first and third dipole arms 430-1, 430-3 each include first and second spaced apart segments 434-1, 434-2, where the first segment 434-1 of the first dipole arm 430-1 is collinear with the first segment 434-1 of the third dipole arm 430-3. The second and fourth dipole arms 430-2, 430-4 may also each include first and second spaced apart segments 434-1, 434-2, where the first segment 434-1 of the second dipole arm 430-2 is parallel to the first segment 434-1 of the fourth dipole arm 430-4. The first segment 434-1 of the second dipole arm 430-2 may be parallel to, but not collinear with, the first segment 434-1 of the fourth dipole arm 430-4 in some embodiments.

Each dipole arm 430 may be formed as a metal pattern on printed circuit board 422. Each metal pattern includes a plurality of widened conductive members 424 that are connected by narrowed trace sections 426. The narrowed trace sections 426 may be implemented as meandered conductive traces. Herein, a meandered conductive trace refers to a non-linear conductive trace that follows a meandered path to increase the path length thereof. The meandered conductive trace sections 426 may have extended lengths yet still have a small physical footprint.

As shown in FIG. 5B, each dipole arm 430 may comprise a loop that includes a series of alternating widened conductive members 424 and narrowed trace sections 426. Each pair of adjacent widened conductive members 424 may be physically and electrically connected by a respective one of the narrowed trace sections 426. Since the narrowed trace sections 426 have a small physical footprint, adjacent widened conductive members 424 may be in close proximity to each other so that the widened conductive members 424 together appear as a single dipole arm at frequencies within the operating frequency range of the low-band radiating element 400. It will be appreciated that in other embodiments, the dipole arms need not have a closed loop design as explained, for example, in the ’513 publication (e.g., the distal ends of two segments that form the loop may not be electrically connected to each other).

As shown best in FIG. 5B, the widened conductive member at the base or “root” of each dipole arm 430 has a slot 428 formed therethrough. These slots 428 extend all the way through the printed circuit board 422. Tabs (not shown) on each feed stalk 410 (which may be feed stalk printed circuit boards) may extend through the respective slots 428 allowing the feed stalks to be electrically connected to the respective dipole arms 430, either through galvanic or capacitive connections. The feed stalks 410 may be positioned directly behind the slots 428 when the radiating element 400 is viewed from the front. As is readily apparent, the feed stalks 410 are not positioned at the horizontal center of the radiating element 400, but instead are offset to one side. As such, the radiating element 400 can be positioned closer to a side of a reflector of a base station antenna than say, for example, the cross-dipole radiating element 200 discussed above.

As shown in FIG. 5B, the dipole arms 430-1 through 430-4 may have similar designs. While not visible in FIGS. 5A-5B, some or all of the widened conductive members 424 that are provided on the front side of the printed circuit board 422 may optionally be replicated on the back side of the printed circuit board 422 and may be aligned with the widened conductive members 424 that are provided on the front side of the printed circuit board 422. In embodiments that include widened conductive members 424 on the back side of the printed circuit board 422, metal-plated vias (not shown) may be used to electrically connect the widened conductive members 424 on the front side of printed circuit board 422 to the widened conductive members 424 on the rear side of printed circuit board 422, or alternatively, the widened conductive members 424 on opposed sides of the printed circuit board 422 may be capacitively coupled to each other. Providing widened conductive members 424 on both sides of printed circuit boards 422 may help increase the operating bandwidth of the low-band radiating element 400.

The narrowed meandered trace sections 426 are designed to act as high impedance sections that interrupt currents associated with nearby high-band radiating elements (e.g., a high-band radiating element 342 of base station antenna 300) that otherwise would be induced on the dipole arms 430. As discussed above, when a nearby high-band radiating element 342 transmits and receives signals, the high-band RF signals may tend to induce currents on the dipole arms 430 of the low-band radiating element 400. This can particularly be true when the low-band and high-band radiating elements are designed to operate in frequency bands having center frequencies that are separated by about a factor of four, as a low-band dipole arm 430 having a length that is a quarter wavelength of the low-band operating frequency will, in that case, have a length of approximately a full wavelength of the high-band operating frequency. The greater the extent that high-band currents are induced on the low-band dipole arms 430, the greater the impact on the characteristics of the radiation pattern of the high-band array. The narrowed meandered trace sections 426 are designed to create the high impedance for high-band currents without significantly impacting the ability of the low-band currents to flow on the dipole arms 430. In some embodiments, the narrowed trace sections 426 may make the low-band radiating element 400 almost invisible to nearby high-band radiating elements, and thus the low-band radiating element 300 may not distort the high-band antenna patterns.

Each widened conductive member 424 may have a respective width $W_1$, where the width $W_1$ is measured in a direction that is generally perpendicular to the direction of current flow along the respective widened conductive member 424. The width $W_1$ of each widened conductive member 424 need not be constant. The narrowed trace sections 426 may similarly have widths $W_2$, where each width $W_2$ is measured in a direction that is generally perpendicular to the direction of instantaneous current flow along the narrowed trace sections 426. The width $W_2$ of each narrowed trace section 426 need not be constant. The average width of each widened conductive member 424 may be, for example, at least twice the average width of each narrowed trace section 426 in some embodiments. In other embodiments, the average width of each widened conductive member 424 may be at least three times, at least five times, or at least seven times the average width of each narrowed trace section 426.

Figure 6A:
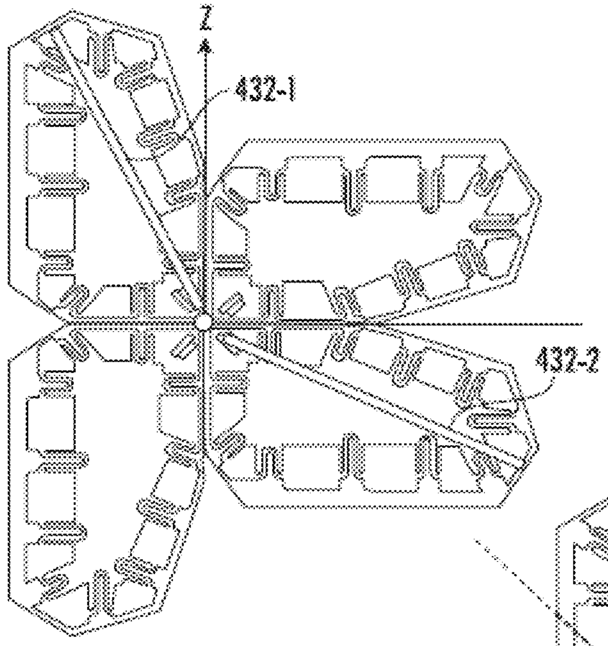
FIGS. 6A-6C are front views of the modified tri-pol low-band radiating element of FIG. 5A that illustrate the operation thereof.
Figure 6B:
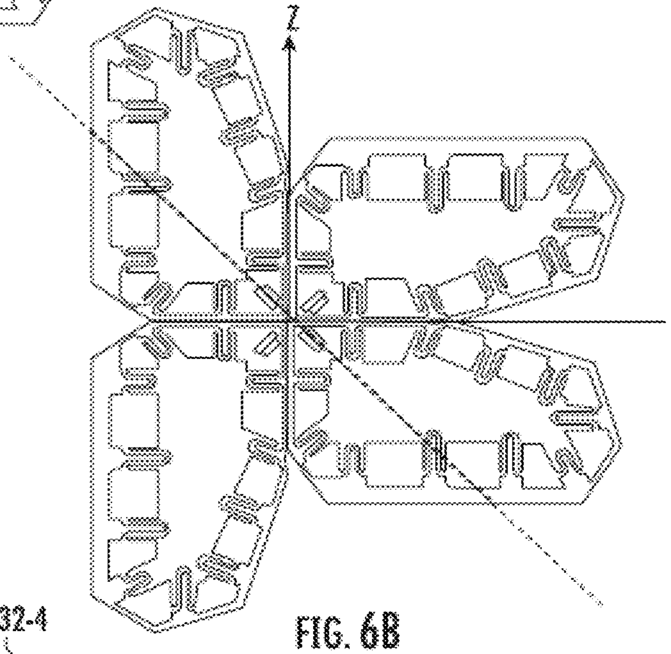
Figure 6C:
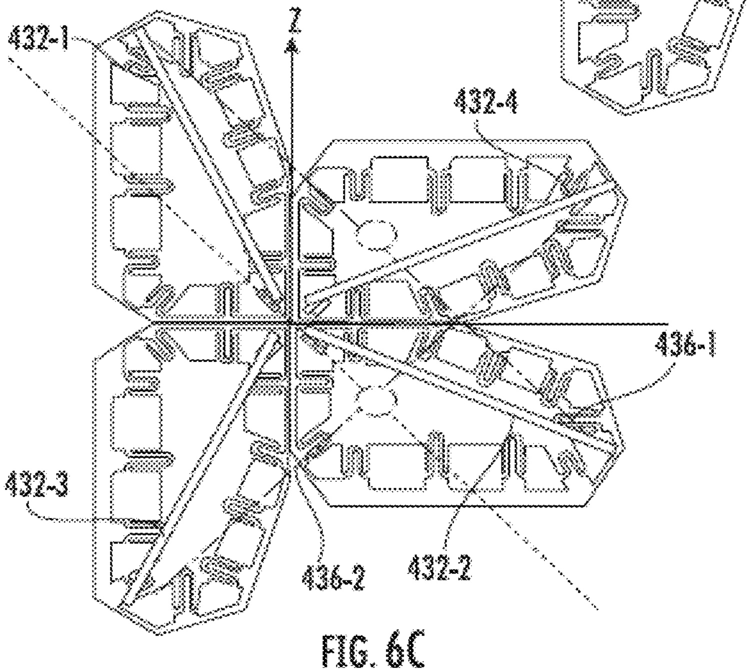

FIGS. 6A-6C are front views of the cloaked tri-pol low-band radiating element 400 of FIG. 5A that illustrate the operation thereof. As shown in FIG. 6A, dipole radiator 420-1 may be excited by feeding an RF signal to dipole arms 430-1, 430-2. In this embodiment, the radiating element 400 is designed so that equal magnitude currents will be excited onto each dipole arm 430-1, 430-2 in response to the RF feed signal. Focusing on dipole arm 430-1, the average current direction along the dipole arm is shown by line segment labelled 432-1. Likewise, on dipole arm 430-2, the average current direction along the dipole arm is shown by line segment labelled 432-2. The segments 432-1, 432-2 that represent the average current direction along dipole arms 430-1, 430-2, respectively, intersect at an angle $\theta_1$. Angle $\theta_1$ is an oblique angle and, more particularly, in the depicted embodiment is an obtuse angle.

FIG. 6B illustrates the desired polarization for the antenna beam generated by dipole radiator 420-1 (which include dipole arms 430-1, 430-2), which is a slant −45° polarization.

FIG. 6C illustrates the average current direction along each dipole arm 430 as well as the polarization of the antenna beams generated by dipole radiators 420-1, 420-2. The average current directions 432-1, 432-2 for dipole arms 430-1, 430-2, respectively, are discussed above. The average current direction along dipole arm 430-3 is shown by line segment labelled 432-3 and the average current direction along dipole arm 430-4 is shown by line segment labelled 432-4. The segments 432-3, 432-4 intersect at an angle $\theta_2$. Angle $\theta_2$ is an oblique angle and, more particularly, in the depicted embodiment is an obtuse angle. Dashed line 436-1 shows the polarization of dipole radiator 420-1 and dashed line 436-2 shows the polarization of dipole radiator 420-2. As can be seen, the dipole radiators 420-1, 420-2 generate antenna beams having slant −45° and slant +45° polarization, respectively Thus, the angles $\theta_1$ and $\theta_2$ are selected so that given the average current direction along the dipole arms of dipole radiators 420-1, 420-2 the dipole radiators will generate antenna beams having slant −45° and slant +45° polarization, respectively.

Figure 7A:
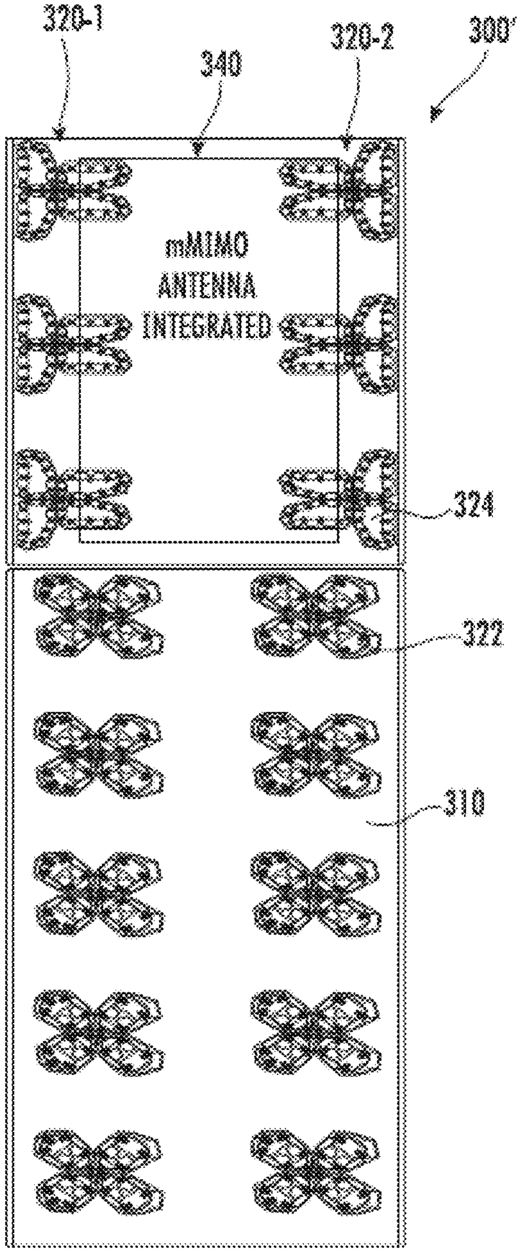
FIG. 7A is a schematic front view of a base station antenna according to embodiments of the present invention that includes mixed linear arrays of low-band radiating elements.
Figure 7B:
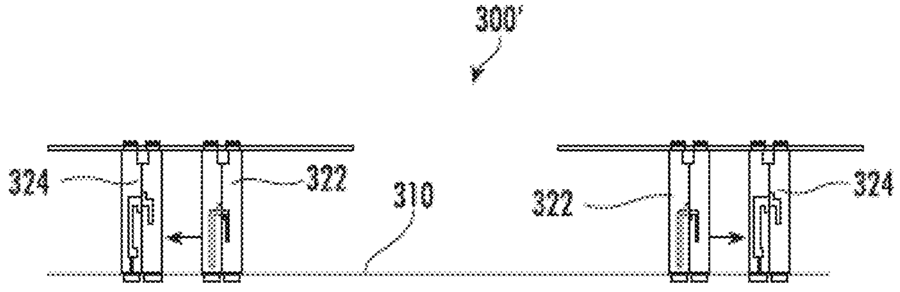
FIG. 7B is a schematic top view of the base station antenna of FIG. 7A that illustrates how use of the cloaked tri-pol low-band radiating elements according to embodiments of the present invention provides room for more columns of radiating elements in the massive MIMO array.

As discussed above, pursuant to embodiments of the present invention, base station antennas are provided that include at least one vertically-extending low-band linear array and a multi-column high-band array. The at least one low-band linear array may include at least two different types of lower-band radiating elements. FIG. 4B schematically illustrated such a base station antenna. FIGS. 7A and 7B illustrate another example of such a base station antenna 300'. In particular, FIG. 7A is a schematic front view of base station antenna 300', while FIG. 7B is a schematic top view of the base station antenna 300' that illustrates how the use of the modified tri-pol radiating elements according to embodiments of the present invention provides room for more columns of radiating elements in the massive MIMO array.

As shown in FIG. 7A, base station antenna 300' includes a reflector 310, a first low-band array 320-1 comprising a first vertically-extending column of low-band radiating elements 322, 324 that are mounted to extend forwardly from the reflector 310, a second low-band array 320-2 comprising a second vertically-extending column of low-band radiating elements 322, 324 that are mounted to extend forwardly from the reflector 310, and a multi-column array 340 of high-band radiating elements (not individually shown) that is positioned between the first and second low-band arrays 320-1, 320-2. Each low-band array 320 may extend for most or all of the length of the base station antenna 300'. In contrast, the high-band array 340 may be much shorter, and in the depicted embodiment is located in the upper half of base station antenna 300'.

The first and second low-band arrays 320-1, 320-2 each include two different types of radiating elements, namely cross-dipole radiating elements 322 as well as modified tri-pol radiating elements 324 according to embodiments of the present invention. As can be seen, the cross-dipole low-band radiating elements 322 are used in the portions of linear arrays 320-1, 320-2 that are not horizontally adjacent to the high-band array 340, while modified tri-pol radiating elements 324 according to certain embodiments of the present invention are used in the portions of linear arrays 320-1, 320-2 that are horizontally adjacent to the high-band array 340. As shown, the modified tri-pol radiating elements 324 may be positioned significantly closer to the side edges of the reflector 310 than the cross-dipole radiating elements 322. Consequently, there is more room in the upper middle portion of the reflector 310 for the high-band array 340. As shown in FIG. 7A, modified tri-pol radiating elements 324 may be positioned so that the dipole arms thereof extend substantially to the edge of the reflector 310 in order to reduce the width of the base station antenna 300'. This may slightly degrade the performance of the low-band arrays 320 since the modified tri-pol radiating elements 324 do not have an optimum amount of reflector behind them, but this degradation may often be acceptable, particularly since most of the radiating elements 322 in the low-band arrays 320 are positioned more inwardly on the reflector 310. Additionally, this arrangement where the modified tri-pol radiating elements 324 are positioned are outwardly than the cross-dipole radiating elements 322 creates a horizontal stagger in the linear arrays 320, which may assist in narrowing the azimuth beamwidth of the antenna beams generated by the low-band linear arrays. This may result in enhanced performance and/or allow for the use of slightly smaller low-band radiating elements 322, 324, both of which are beneficial.

The modified tri-pol radiating elements 324 are implemented as cloaked radiating elements that may be substantially transparent to RF energy in the operating frequency band of the high-band array 340. The cross-dipole radiating elements 322 are also implemented as cloaked radiating elements because, while not shown, additional arrays of radiating elements may be mounted on the lower portion of the reflector 310. The cross-dipole radiating elements 322 may be designed to be transparent to RF energy in the operating frequency bands of any such arrays. For example, as discussed above with respect to FIG. 4B, a plurality of linear arrays of mid-band radiating elements may be included in antenna 300'. If such mid-band linear arrays are included in base station antenna 300, the cross-dipole radiating elements 322 may be designed to be transparent to RF energy in, for example, some or all of the 1427-2690 MHz frequency bands.

Figure 8A:
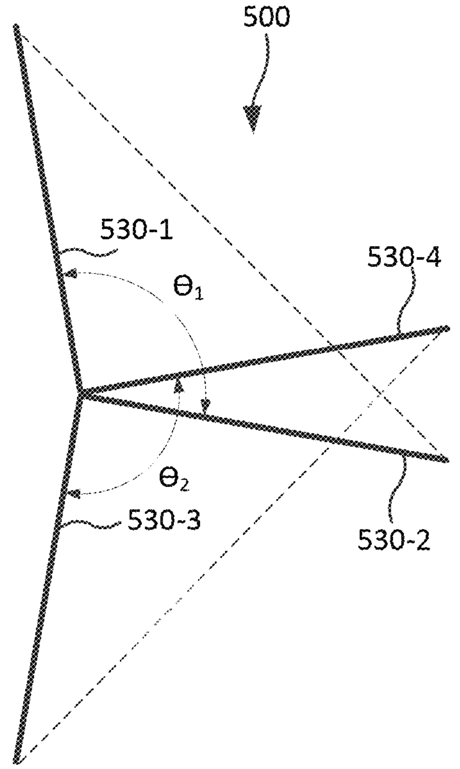
FIGS. 8A and 8B are schematic front views of modified tri-pol radiating elements according to further embodiments of the present invention.
Figure 8B:
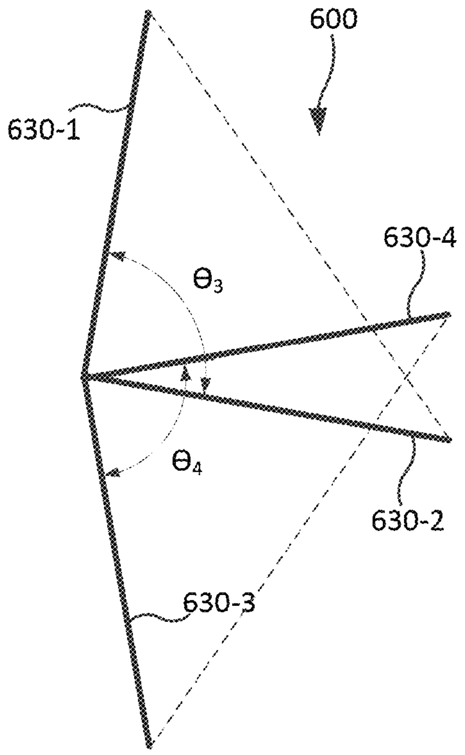

FIGS. 8A and 8B are schematic front views of modified tri-pol low-band radiating elements according to further embodiments of the present invention.

Referring to FIG. 8A, a modified tri-pol radiating element 500 includes a first dipole radiator that has dipole arms 530-1, 530-2 and a second dipole radiator that has dipole arms 530-3, 530-4. While the dipole arms 530 are shown schematically in FIG. 8A as bold line segments, it will be appreciated that any dipole arm design may be used to form the dipole arms, including straight dipole arms (which may or may not be cloaked designs), loop dipole arms, leaf-shaped dipole arms, etc. The modified tri-pol radiating element 500 differs from the modified tri-pol radiating element 400 that is discussed above in that dipole arms 530-1 and 530-3 do not extend along a common vertical axis, but instead each dipole arm 530-1, 530-3 is angled with respect to the vertical. Likewise, dipole arms 530-2 and 530-4 do not extend along a respective horizontal axes, but instead each dipole arm 530-2, 530-4 is angled with respect to the horizontal. As a result, the axes defined by dipole arms 530-1, 530-2 intersect to define an obtuse angle $\theta_1$, and the axes defined by dipole arms 530-3 and 530-4 intersect to define an obtuse angle $\theta_2$. The obtuse angles $\theta_1$ and $\theta_2$ may be selected so that dipole radiator 520-1 will emit radiation having a slant −45° polarization, and so that dipole radiator 520-2 will emit radiation having a slant +45° polarization.

Referring to FIG. 8B, a modified tri-pol radiating element 600 includes a first dipole radiator that includes dipole arms 630-1, 630-2 and a second dipole radiator that includes dipole arms 630-3, 630-4. While the dipole arms 630 are shown schematically in FIG. 8B as bold line segments, it will be appreciated that any dipole arm design may be used to form the dipole arms, including straight dipole arms (which may or may not be cloaked designs), loop dipole arms, leaf-shaped dipole arms, etc. The modified tri-pol radiating element 600 differs from the modified tri-pol radiating element 500 that is discussed above, except that dipole arms 630-1 and 630-2 intersect to define an acute angle $\theta_3$ as opposed to an obtuse angle. Dipole arms 630-1 and 630-2 are configured so that the emitted radiation will have a slant −45° polarization. Likewise, dipole arms 630-3 and 630-4 intersect to define an acute angle $\theta_4$ as opposed to an obtuse angle. Dipole arms 630-3 and 630-4 are configured so that the emitted radiation will have a slant +45° polarization.

While FIGS. 5A-5B illustrate all of the dipole arms 430 of radiating element 400 being cloaked dipole arms, embodiments of the invention are not limited thereto. For example, in an alternative embodiment only dipole arms 430-2 and 430-4 may be configured as cloaked dipole arms, and dipole arms 430-1 and 430-3 may be configured as non-cloaked dipole arms (e.g., straight metal arms, metal leaf's, etc.). Thus, it will be appreciated that many modifications may be made to the radiating element 400, for example, without departing from the scope of the present invention.

It will also be appreciated that the current flow on the two dipole arms of a dipole radiator according to embodiments of the present invention need not be equal. In situations where the current flow is not equal, the angle defined by the intersection of the two dipole arms is modified so that the polarization of the radiating pattern generated by the dipole radiator will have a slant +/−45° polarization.

The tri-pol radiating elements according to embodiments of the present invention may facilitate implementing two low-band arrays and a massive MIMO high-band array in the same base station antenna while keeping the width of the antenna to a reasonable size. They also facilitate using modular massive MIMO arrays within a base station antenna, since they allow the low-band radiating elements to be positioned very close to the side edges of the reflector. The cloaking design allows the tri-pol radiating elements to be substantially invisible to the radiation emitted by the high-band radiating elements, and hence does not substantially impact characteristics of the high-band antenna beams.

While the discussion above focuses on low-band radiating elements, it will be appreciated that the techniques discussed above can be used with radiating elements that operate in any appropriate frequency band.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A dual-polarized radiating element for a base station antenna, comprising:

a first dipole radiator that includes a first dipole arm that is configured to have an average current direction that extends in a first direction and a second dipole arm that is configured to have an average current direction that extends in a second direction, where the second direction forms a first oblique angle with the first direction;

a second dipole radiator that includes a third dipole arm that is configured to have an average current direction that extends in the third direction and a fourth dipole arm that is configured to have an average current direction that extends in a fourth direction, where the fourth direction forms a second oblique angle with the third direction, wherein the first dipole radiator is configured to transmit RF radiation having slant −45° polarization, and the second dipole radiator is configured to transmit RF radiation having slant +45° polarization.

2. The dual-polarized radiating element of claim 1, wherein the first oblique angle is the same as the second oblique angle.

3. The dual-polarized radiating element of claim 1, wherein the first and second oblique angles are first and second obtuse angles.

4. The dual-polarized radiating element of claim 1, wherein the first and second oblique angles are first and second acute angles.

5. The dual-polarized radiating element of claim 1, wherein at least one of the first and second dipole arms includes a plurality of spaced-apart conductive members that are connected to each other via respective inductive trace segments.

6. The dual-polarized radiating element of claim 1, wherein at least one of the first dipole arm, the second dipole arm, the third dipole arm and the fourth dipole arm is in the form of a conductive loop.

7. The dual-polarized radiating element of claim 1, wherein the first dipole arm, the second dipole arm, the third dipole arm and the fourth dipole arm meet in a central region of the radiating element, and the first dipole arm extends upwardly from the central region, the third dipole arm extends downwardly from the central region, and the second and fourth dipole arms both extend to a first side of the central region.

8. The dual-polarized radiating element of claim 1, wherein the first dipole arm is spaced apart from the third dipole arm.

9. A dual-polarized radiating element for a base station antenna, comprising:

a first dipole radiator that includes a first dipole arm that generally extends along a first axis and a second dipole arm that generally extends along a second axis that is different from the first axis; and a second dipole radiator that includes a third dipole arm that generally extends along the first axis and a fourth dipole arm that generally extends along a third axis that is different from the first axis, wherein at least one of the first dipole arm, the second dipole arm, the third dipole arm and the fourth dipole arm comprises a cloaked dipole arm that include inductive elements that are configured to suppress currents in a higher frequency band.

10. The dual-polarized radiating element of claim 9, wherein each of the first dipole arm, the second dipole arm, the third dipole arm and the fourth dipole arm comprises a conductive loop.

11. The dual-polarized radiating element of claim 10, wherein each conductive loop has first and second spaced apart opposed segments, and wherein a first segment of the first dipole arm is collinear with a first segment of the third dipole arm.

12. The dual-polarized radiating element of claim 10, wherein each conductive loop has first and second spaced apart opposed segments, and wherein a first segment of the second dipole arm is parallel to a first segment of the fourth dipole arm.

13. The dual-polarized radiating element of claim 9, wherein the first dipole arm is configured to have an average current direction that extends in a first direction and the second dipole arm is configured to have an average current direction that extends in a second direction, where the first and second directions intersect to define an obtuse angle.

14. The dual-polarized radiating element of claim 9, wherein the first dipole arm, the second dipole arm, the third dipole arm and the fourth dipole arm meet in a central region of the radiating element, and the first dipole arm extends upwardly from the central region, the third dipole arm extends downwardly from the central region, and the second and fourth dipole arms both extend to a first side of the central region.

15. The dual-polarized radiating element of claim 9, wherein the first and second axes define an obtuse angle.

16. A dual-polarized radiating element for a base station antenna, comprising:

a feed stalk;

a dipole radiator printed circuit board mounted on the feed stalk, the dipole radiator printed circuit board including a first dipole arm, a second dipole arm, a third dipole arm and a fourth dipole arm that extend from a central region where the feed stalk electrically connects to the dipole radiator printed circuit board, wherein the first dipole arm extends upwardly from the central region, the third dipole arm extends downwardly from the central region, and the second and fourth dipole arms both extend to a first side of the central region, and wherein the first and second dipole arms form a first dipole radiator and the third and fourth dipole arms form a second dipole radiator, wherein a first segment of the first dipole arm extends collinear to a first segment of the third dipole arm.

17. The dual-polarized radiating element of claim 16, wherein each of the first dipole arm, the second dipole arm, the third dipole arm and the fourth dipole arm comprises a conductive loop.

* * * * *